United States Patent [19]

Gagliani et al.

[11] 4,361,453
[45] Nov. 30, 1982

[54] METHODS OF PREPARING POLYIMIDES AND ARTIFACTS COMPOSED THEREOF

[75] Inventors: John Gagliani; Raymond Lee; Anthony L. Wilcoxson, all of San Diego, Calif.

[73] Assignee: International Harvester Company, Chicago, Ill.

[21] Appl. No.: 262,520

[22] Filed: May 11, 1981

Related U.S. Application Data

[62] Division of Ser. No. 186,629, Sep. 12, 1980, Pat. No. 4,305,796.

[51] Int. Cl.$^3$ .............................................. B32B 5/18
[52] U.S. Cl. .............................. 156/79; 204/159.14; 204/159.19; 521/54; 521/185; 521/189; 521/122; 523/219; 524/592; 524/877; 264/26; 264/45.3; 264/54; 264/338; 264/DIG. 5
[58] Field of Search ...................... 156/79; 264/26, 54, 264/45.3; 521/189, 122; 204/159.14, 159.19; 523/219; 524/592, 877

[56] References Cited

U.S. PATENT DOCUMENTS

| | | | |
|---|---|---|---|
| 3,471,444 | 10/1969 | Sherer | 528/229 |
| 3,677,921 | 7/1972 | Stivers | 260/45.9 R |
| 3,803,103 | 4/1974 | Magay | 428/379 |
| 4,166,168 | 8/1979 | D'Alelio | 204/159.11 |

*Primary Examiner*—Morton Foelak
*Attorney, Agent, or Firm*—Le Blanc, Nolan, Shur & Nies

[57] ABSTRACT

Methods of converting essentially unpolymerized precursors into polyimides in which the precursors are exposed to microwave radiation. Preheating, thermal post-curing, and other techniques may be employed to promote the development of optimum properties; and reinforcements can be employed to impart strength and rigidity to the final product. Also disclosed are processes for making various composite artifacts in which non-polymeric precursors are converted to polyimides by using the techniques described above.

11 Claims, No Drawings

METHODS OF PREPARING POLYIMIDES AND ARTIFACTS COMPOSED THEREOF

The invention described herein was made in the performance of work under NASA Contract No. NAS9-15484 and is subject to the provisions of Section 305 of the National Aeronautics and Space Act of 1958 (72 Stat. 435; 42 USC 2457).

This application is a division of our application Ser. No. 186,629 filed Sept. 12, 1980, now U.S. Pat. No. 4,305,796.

In one aspect our invention relates to polyimides and, more particularly, to novel, improved methods for preparing polymers of that character.

As a class, polyimides are extremely valuable materials because of their chemical inertness, strength, and temperature resistance. There are also certain classes of proprietary polyimides which have such additional advantages as retention of strength, resiliency, and flexibility at cryogenic temperatures; resistance to hydrolysis and ultraviolet degration; capability of undergoing oxidative degradation without generating toxic products or smoke; a novel closed cell structure which suits them for applications in which they are in contact with moving parts; the capacity to be transformed into porous fibers and other shapes and into rigid panels, cushioning, thermal acoustical insulation and a host of other novel products. These polyimides are disclosed in, inter alia, U.S. Pat. Nos. 3,506,834 issued Apr. 14, 1970, to Boram et al.; 3,726,831 and 3,726,834 issued Apr. 10, 1973, to Acle et al. and Acle, respectively; 4,070,312 issued Jan. 24, 1978, to Gagliani et al; and U.S. Pat. No. Re. 30,213 issued Feb. 12, 1980, to Gagliani and in pending U.S. patent applications Ser. Nos. 935,378 and 952,738 filed Aug. 21, 1978, now U.S. Pat. No. 4,299,787, and Oct. 19, 1978, by Gagliani and 186,668 filed Sept. 12, 1980, now U.S. Pat. No. 4,305,796, by Gagliani et al Application Ser. No. 935,378 has since matured into U.S. Pat. No. 4,241,193 dated Dec. 23, 1980.

These proprietary polyimides are prepared by reacting 3,3',4,4'-benzophenonetetracarboxylic acid or a dianhydride of that acid with a lower alkyl alcohol to form a half ester of the acid and then adding one or more primary diamines to the half ester solution to form an essentially monomeric precursor. This monomer is then converted to a polyimide by heating it.

Many of these polyimides have the added attribute of a cellular or foam type physical structure. The foam can be employed as such—in a seat cushion or as insulation, for example. Or, using the procedure described in application Ser. No. 935,378, now U.S. Pat. No. 4,241,193, as a further example, the flexible, resilient polyimide foam can be converted to a dense, rigid, structurally strong, intumescent material by heating it under pressure. The foam can also be comminuted and used as a molding powder as described in U.S. Pat. No. 3,726,834.

The general model for the chemical reactions which are effected in converting the precursor to a polyimide of the character discussed above are shown below. The actual reactions are typically much more complex depending upon the number of diamines in the precursor.

Esterification: (I)

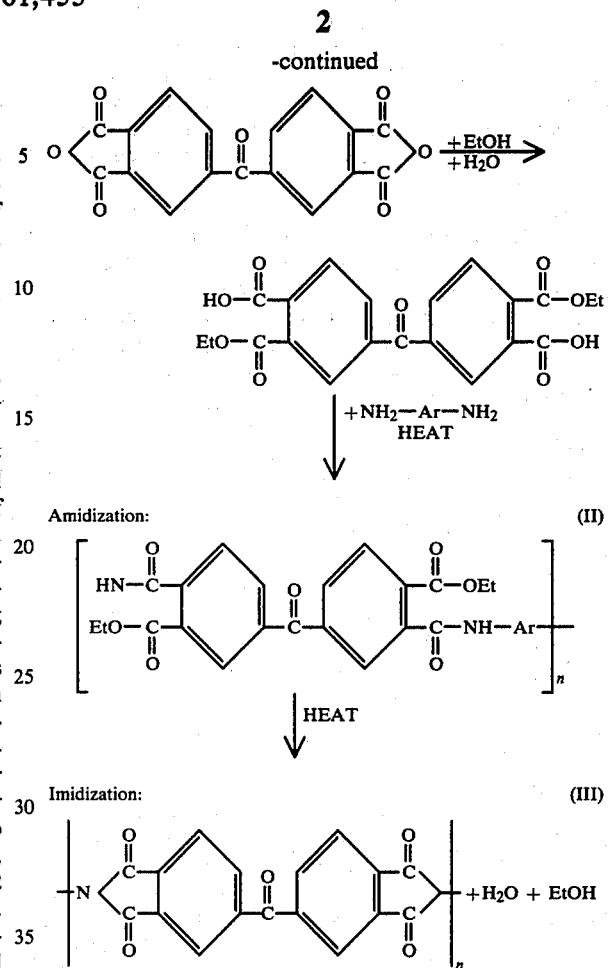

Heretofore, the foaming of the precursor and the curing of the foam to develop the polyimide chemical structure have been accomplished by heating the precursor in a circulating air oven.

We have now discovered that polyimide foams of superior quality can be produced, typically in less time, by employing microwave heating to cure the precursor.

In addition to being faster, microwave heating has the advantages of producing foams with a more homogeneous cellular structure and of making it unnecessary to handle the fragile, uncured foam which is generated as the precursor is heated.

Exemplary of the polyimide foams which can be prepared to advantage by the use of microwave heating in accord with the principles of the present invention are the copolymers described in U.S. Pat. No. Re. 30,213 and the terpolymers described in copending application Ser. No. 186,668.

The patented copolymers are derived from precursors which, in their preferred forms, are essentially equimolar mixtures of a lower alkyl half ester of 3,3',4,4'-benzophenonetetracarboxylic acid and two primary diamines. One of the diamines is a heterocyclic diamine, and the other is an aromatic meta- or para-substituted diamine which is free of aliphatic moieties. A ratio of 0.4 to 0.6 mole of heterocyclic diamine per mole of 3,3',4,4'-benzophenonetetracarboxylic acid ester is preferred as this results in foams with optimal mechanical properties. However, precursors having a heterocyclic diamine/acid ester ratio of 0.3 have also successfully been employed.

The terpolyimides described in copending application No. 186,668 differ chemically from the copolyimides just described in that they are made from precursors which include an aliphatic diamine in addition to the aromatic and heterocyclic diamines employed in the copolyimide precursors.

From 0.05 to 0.3 mole of aliphatic diamine per 1.0 mole of benzophenonetetracarboxylic acid ester can be employed, and from 0.1 to 0.3 mole of heterocyclic diamine per mole of ester can be used.

Exemplary of the aromatic and heterocyclic diamines that can be employed in the just described copolyimides and terpolyimides are:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene Many other aromatic and heterocyclic diamines have been described in the open and patent literature dealing with the making of polyimides—see, for example, U.S. Pat. Nos. 3,179,614 issued Apr. 20, 1965, to Edwards; 3,575,891 issued Apr. 20, 1971, to LeBlanc et al.; and 3,629,180 issued Dec. 21, 1971, to Yoda et al. Aromatic and heterocyclic diamines selected from those listed in the literature can also be utilized in copolyimides and terpolyimides of the character described above.

Aliphatic diamines having from three to 12 carbon atoms have been employed in the terpolyimides. However, diamines having no more than six carbon atoms will typically prove preferable. Also, aliphatic diamines with even numbered chains are preferred.

Aliphatic diamines we have used include:
1,3-diaminopropane
1,4-diaminobutane
1,6-diaminohexane
1,8-diaminooctane
1,12-diaminododecane
and Jeffamine 230. The latter is available from the Jefferson Chemical Company and has the formula:

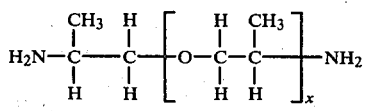

where x is approximately 2.6.

As discussed briefly above, the precursors of the polyimides with which we are concerned are prepared by first reacting 3,3',4,4'-benzophenonetetracarboxylic acid (or preferably, its dianhydride) with an esterification agent to form an alkyl diester or half ester. Exemplary esterification agents are methyl, ethyl, propyl, and isopropyl alcohols. Methanol is in many cases preferred because of its widespread availability, low cost, and other attributes; because its use facilitates conversion of the precursor to a polyimide foam; and because the foams made from the methyl esters tend to be more flexible, resilient, and compression set resistant.

Ethanol is also a preferred esterification agent.

The esterification reaction is followed by the addition of the diamine or diamines, which are dissolved in the reaction mixture. The temperature is kept below the reflux temperature of the esterification agent during dissolution of the diamines and low enough to avoid polymerization of the diamines and ester.

Graphite, glass, and other fibers as well as other fillers such as glass microballoons and additives such as cross linking agents can be added to the resulting composition to impart wanted properties to the final product. A surfactant can also be added to increase fatigue resistance and to make the foam more flexible and resilient by increasing its bubble stability and the uniformity of the cellular structure.

One preferred surfactant is FS-B, a nonionic, fluorinated, polyalkylene copolymer manufactured by E. I. DuPont de Nemours and Company.

Other surfactants that have been successfully employed are FS-C, AS-2, and X-3, nonionic surfactants of the same general chemical composition as FS-B and manufactured by the same company, and L-530, L-5410, and L-5430, which are silicone surfactants manufactured by Union Carbide Company. We employ from 0.015 to 1.5 percent of surfactant based on the weight of the ester and diamine constituents.

The material existing after dissolution of the diamines and the addition of any additives may range in form from a "liquid resin" to a spreadable, pastelike formulation depending upon the nature and quantity of any fillers added to the resin. The material may be used in the form just described; or it can be transformed into an amorphous powder capable of being converted into a flexible, resilient, copolyimide or terpolyimide foam. Although not essential, it is preferred that spray drying be employed for this purpose because the liquid resin can thereby be transformed on a continuous basis and in one step into a dry powder. Also, spray drying allows for modification of the precursor in ways which can be used to vary the properties of the final product.

One suitable spray drying process is described in copending application Ser. No. 186,670 filed Sept. 12, 1980, now U.S. Pat. No. 4,296,208. In general that process involves the atomization of the feedstock followed by entrainment of the droplets thus formed in a swirling annulus of heated air (or other gas). This produces almost instantaneous drying of the droplets. Optimum results are typically obtained by employing spray dryer chamber gas inlet temperatures in the range of 100°–110° C. and by so regulating the flow of material through the dryer as to limit the chamber outlet temperature of the gas to 80° C.

For optimum results the dried precursor is comminuted and/or screened, if necessary, to a size distribution of about 300 microns×0 before it is converted to the corresponding polyimide by microwave heating.

Dry particulate precursors produced by the technique just described can be converted to polyimide foams by the free rise technique; by an open mold, constrained rise technique in which spacers are employed to limit the rise of the foam; or in a closed mold.

Foaming-curing parameters that have proven satisfactory in converting representative precursors to flexible, resilient foams are two to 55 minutes exposure to high frequency radiation in an oven operating at a frequency of 915 to 2450 mHz and at 3.75 to 15 kW power and a power output to precursor unit weight ratio of 0.6 to 1 kW/kg.

Preferably, dry particulate precursors are preheated before they are exposed to microwave radiation. This contributes to higher foam rise, a more homogeneous cellular structure, and a reduced scrap rate.

Preheat temperatures of 121.1° to 148.9° C. (250° to 300° F.) for 2–6 minutes have been successfully employed.

Steady application of the microwave energy is not required, and pulsed or cyclic exposure of the precursor to the microwave energy may even produce superior results. Typically, the duration of the microwave energy pulses and the intervals therebetween will be on the order of 60 and 20 seconds, respectively.

Also, conductive fillers can often advantageously be incorporated in the precursor to promote its conversion to a polyimide by generating additional thermal energy. From 5 to 20 weight percent of activated carbon or graphite can be employed for that purpose.

Another technique that can be used to advantage in making polyimide foams and artifacts including such foams by the practice of the present invention is thermal heating of the microwave cavity. Temperatures in the range of 121.1° to 232.2° C. (250° to 450° F.) are employed.

Similarly, an optimum product can in many, if not most, cases be obtained by heating the substrate or mold on or in which the precursor is foamed to a temperature of 121.1° to 148.9° C. (250° to 300° F.) before the precursor is exposed to microwave energy.

Also, quality may in many cases be optimized by employing different microwave energy power levels to foam the precursor and to subsequently cure the foam. For example in making flexible, resilient, copolyimide foams from precursors of the character described above in existing equipment, a power level of 10 kW for foaming followed by one of 15 kW has been selected as optimum (for terpolyimide systems, power levels of 10 and 8.4 kW were chosen).

As suggested above, it is not essential that the precursor be dried before it is foamed. In fact, the use of a liquid resin precursor can often be employed to advantage—e.g., in making composite products such as reinforced panels.

Another aspect of our invention, in this regard, resides in novel, improved processes for making artifacts of the type just described and others of comparable character.

In one exemplary process for making panels in accord with the principles of our invention, a liquid resin precursor as described above and compounded with selected fillers is spread on glass cloth (e.g., Owens Corning Style 120) wet with the resin. A second resin wetted glass cloth is placed on top the compounded resin.

Solvent is removed by heating the resulting sandwich in a circulating air oven at a temperature of not more than 300° and preferably about 250° F. for 2 to 16 hours or by exposing it to microwave radiation for 2.25 to 12 minutes, typically at a power level on the order of 1.25 to 2 kW.

Foaming and curing of the precursor by the open mold, constrained rise technique using the process parameters described above follows the solvent removal step; and this is typically succeeded by thermal postcuring as described hereinafter.

Various fillers including glass strands and microballoons can be employed in panels made by the techniques just described. From 5 to 40 weight percent of filler based on the weight of the polyimide into which the precursor is converted can be used.

One exemplary combination of fillers that has proven satisfactory is 7.5 to 10 weight percent of unsized or heat cleaned, glass strands and 12.5 to 15 weight percent of glass microballoons (e.g., 3M Company C-15-X).

In applications of our invention such as that just described the liquid resin precursor will typically be diluted with an alkyl alcohol in a ratio of 20 parts per hundred (phr) of resin in the case of copolyimide systems and 30 phr if terpolyimide resins are involved before the filler(s) is added. In such cases we have found that the quality of the product is optimized by reducing the solvent content of the resin and reinforcement mixture to a level of 29–31 weight percent by thermal or microwave drying before the precursor is foamed.

In the foregoing and other applications of our invention, the microwave heating step or steps can often be followed to advantage by the thermal postcure of the polyimide mentioned above. This is accomplished by heating the product of the microwave heating step in a circulating air oven at a temperature of 500° to 550° F. for 30 to 200 minutes to complete the curing of the polyimide.

All of the techniques for heating the precursor described above require that a substrate or mold material which is compatible with the microwave radiation be employed. In the open and closed mold techniques, the material must also have sufficient flexural strength to withstand the pressure of the expanding foam. Substrate and mold materials that have been found suitable include Ridout Plastics Company polypropylenes lined with a Teflon coated glass (Taconic 7278); Pyroceram (a Corning Glass crystalline ceramic made from glass by controlled nucleation); and glass filled polyimides. Other materials possessing the necessary attributes discussed above can also be employed.

From the foregoing it will be apparent to the reader that one primary object of the present invention resides in the provision of novel, improved methods of preparing polyimide foams from their precursors and for preparing artifacts containing such foams.

Related, also important, but more specific objects of our invention reside in the provision of methods of the character just described;
   which are relatively economical and capable of producing high quality products in high yield;
   which can be employed to convert both liquid resin and dry particulate precursors to polyimides as well as such precursors compounded with fillers and additives;
   which can be employed to produce polyimide foams and polyimide foam-containing artifacts in large sizes.

Another important, and primary, object of the present invention resides in the provision of novel, improved methods of manufacturing polyimide foams and foam-containing artifacts in which microwave heating is employed to foam the precursor and to cure the foam.

Related, more specific, but nevertheless important objects of our invention reside in the provision of methods for manufacturing polyimide-containing artifacts as recited in the preceding objects in which one or more of the following techniques is utilized in conjunction with microwave heating to tailor the properties or optimize the quality of the artifact: thermal postcuring of the foam; preheating of the substrate or mold on or in which the precursor is foamed or cured; power stepped and pulsed applications of the microwave energy to the material being processed; incorporation of conductive fillers in the precursor; and square shaped beds or loadings of the precursor.

Other important objects and features and additional advantages of our invention will become apparent from the foregoing, from the appended claims, and as the ensuing detailed description and discussion proceeds in conjunction with the working examples in which that discussion and description is incorporated.

The working examples follow:

EXAMPLE I

Among the polyimide systems which have been foamed and cured by the techniques disclosed herein and subsequently evaluated are 1701-1 and 1702-1, both copolyimides, and 1720-1 which is a terpolyimide.

The 1702-1 precursor was prepared by adding 3,3′,4,4′-benzophenonetetracarboxylic acid dianhydride (322.2 g, 1.0 mole) to 240 ml of methyl alcohol and 24 ml of $H_2O$ in a one-liter, three-neck flask equipped with a thermometer, a mechanical stirrer, and a reflux condenser. After addition, the mixture was heated and refluxed until clear. The mixture was then refluxed for an additional 60 minutes to ensure complete esterification of the acid to its half ester.

The reaction mixture was then cooled to 40°–50° C. (104°–122° F.).

2,6 Diaminopyridine (32.8 g, 0.3 mole) and p,p′-methylene dianiline (138.7 g, 0.7 mole) were added to the half ester solution, and the mixture was heated at 60°–65° C. (140°–149° F.) for five minutes.

FS-B surfactant was next added to the mixture in an amount of 0.1 percent based on the weight of the methyl half ester and the diamines.

In some cases the liquid resin precursor this produced was converted to a dry particulate form using the spray drying technique described in copending application No. 186,670, now U.S. Pat. No. 4,296,208, with a spray dryer inlet temperature of 100° C., an outlet temperature of 63°–70° C., and an atomizer speed of 30,000 to 32,000 rpm.

The precursor was diluted with methanol in a ratio of 20 parts of the alcohol to 100 parts of resin before it was spray dried.

The dried powder was collected, sieved through a No. 48 Tyler mesh screen (297 micron diameter openings) and rolled for 30 minutes in a round plastic bottle to eliminate lumps.

The 1701-1 precursors (liquid resin and dry powder) were prepared in the manner just described from the same compounds using a 3,3′,4,4′-benzophenonetetracarboxylic acid methyl ester: 2,6-diamino pyridine: p,p′-methylene dianiline molar ratio of 1.0:0.4:0.6.

The 1720-1 terpolyimide precursors were prepared by forming the methyl half ester of 3,3′,4,4′-benzophenonetetracarboxylic acid in the manner described above. The half ester solution was cooled to 25°–35° C. (77°–95° F.); and 2,6 diaminopyridine (32.8 g, 0.3 mole) and p,p′-methylene dianiline (99.1 g, 0.5 mole) were added and the contents of the flask mixed for 15 minutes. 1,6 Diaminohexane (23.7 g, 0.2 mole) was then added at a slow enough rate to keep the reaction temperature from exceeding 65° C. (149° F.), completing the preparation of the liquid resin.

To make the dry particulate resins, FS-B surfactant (0.1 weight percent) was added to the liquid resin, the latter diluted with 30 phr of methyl alcohol, and the resulting liquid spray dried with the reactor operated at an inlet temperature of 100° C. and outlet temperatures in the range of 69°–75° C.

EXAMPLE II

We pointed out above that advantage can be taken of the present invention to produce rigid artifacts such as panels as well as flexible, resilient foams.

One procedure for preparing rigid panels, which also demonstrates that our invention can be used to process liquid resin precursors as well as powders, includes the step of compounding a liquid resin precursor with selected fillers in a variable speed, ABBE double shaft mixer until the filler is thoroughly wetted. Glass cloth (120 style) wetted with resin is placed on a sheet of aluminum foil. The resin mixture is spread over the cloth to a depth depending upon the density and thickness desired. The top surface of the panel is then covered with another piece of wetted glass cloth.

Solvent is removed by drying the wet panel in a circulating air oven at 82° C. (180° F.) for 120 minutes or in a microwave oven until 29–31 percent of the solvent has been removed for a phr dilution ratio of 20.

The aluminum foil is removed from the dried panel and the sample placed between two sheets of Teflon-coated glass cloth.

The dried panel is further processed by foaming and curing. Foaming of the panel is carried out in the microwave oven at a power output of 5.0–10 kW between two sheets of microwave compatible material. The samples were cured in a circulating air oven at a temperature of 287.7° C. (550° F.) for 30 minutes and cut to the desired dimensions.

Microwave drying in this and other applications of our invention involving the drying of a precursor containing a liquid resin are in general preferred. The advantages of this technique are shorter drying cycles and more even drying, which results in a superior product.

Particularly in making larger panels, and also in other applications of our invention, we prefer to heat the substrate or mold prior to foaming the precursor, be it a liquid resin or dry powder. This results in greater expansion and a consequent reduction in foam density, which is often advantageous. Preheat temperatures which produce the wanted results are those in the 250°–300° F. range.

Initial tests of promising panels included visual observation followed by density, compressive and flexural strength, and screw withdrawal tests.

Compression tests used the procedure described in ASTM Standard C365. The apparatus was an Instron Model TM-SM compression tester with a full-scale load range of 500 g and a crosshead speed range of 0.05 to 10.0 cm/min.

Direct screw withdrawal tests used the procedure and apparatus described in ASTM Standard D-1761.

Determination of the flexural strength was carried out by a modified form of MIL-STD-401 using a test specimen size of approximately 7.5×17.5 cm (19×6.9 in).

The burning characteristics of the rigid panels were obtained by observing flame penetration at various time intervals up to 10 minutes when the specimen was subjected to a Meker burner, by determination of the smoke density in accordance with the procedure for using the NBS Smoke Density Chamber (see American Instrument Co. Aminco Catalog No. 4-5800, Instruction No. 941), and by measuring the relative flammability of the panels from determination of the oxygen index (LOI) The test apparatus for this determination was prepared in accordance with ASTM Standard D-2863.

The following examples describe, in more detail, the making and evaluation of rigid polyimide foam filled panels by the process we have invented and described in the preceding paragraphs.

EXAMPLE III

A 1702-1 liquid resin modified with 2.2 weight percent of Imperial Chemical Company L-170 crosslinking agent was used to make a panel by the process described in Example II. The filler was composed of Owens Corning type 405 glass strands which had been heated at 800° F. to remove the sizing. Unsized or heat cleaned strands tend to separate into individual small diameter fibers when blended with the liquid resin. This results in a lower foam rise and a finer, higher density cellular structure. Therefore, a lower, less expensive concentration of heat cleaned strands can be used.

The process parameters are summarized in the following table:

TABLE 1

Process Parameters for the Fabrication of Large and Small Wall Panel Cores by the Liquid Process

| Parameter | Area of the Wall Panel Core | |
|---|---|---|
| | 4200/cm² (651 in²) | 413 cm² (64 in²) |
| Loading | 0.119 kg/m² (0.245 lbs/ft²) | 0.119 kg/m² (0.245 lbs/ft²) |
| Thickness | 1.27 cm (0.50 in.) | 1.27 cm (0.50 in.) |
| Substrate | Pyrex | Pyroceram |
| Glass Strands | 25% 0.635 cm (0.25 in.) | 30% 0.635 cm (0.25 in.) |
| Drying Power | 1.25 kW | 1.25 kW |
| Time | 10 minutes | 2.25 minutes |
| Foaming Power | 5.0 kW | 5.0 kW |
| Time | 17 minutes | 6 minutes |
| Curing Temperature | 288° C. (550° F.) | 288° C. (550° F.) |
| Time | 45 minutes | 30 minutes |

The resulting product is a low density reinforced polyimide which is suited for use as the core of a wall panel in aircraft interiors, for example.

EXAMPLE IV

Another specific procedure for making a rigid panel differs from that described generally above and from the specific procedure of the preceding example primarily by the technique employed to lay up the panel. Half of the resin and reinforcement mixture was spread on the wetted glass cloth, and this was followed by microwave drying. The remaining mixture was laid up on this layer; this was followed by second stage drying.

This innovation resulted in uniform solvent evolution throughout the panel and improved panel surfaces.

A typical drying cycle for a 1.11 m² (12 ft²) panel was 15 minutes for the first stage followed by 30 minutes for the second stage using a power output of 10 kW.

One rigid panel was produced by the technique just described using 1.59 cm (0.625 in) thick Pyrex plates and the following process parameters.

TABLE 2

| | |
|---|---|
| Resin: | 1702-1 modified with 2.2 percent crosslinking agent. |
| Reinforcement: | 10.5 percent glass microballoons, 3M type C15X 8.0 percent unsized chopped strands, 0.635 cm (¼ in.) Owens Corning |
| Dry: | Two stage lay up and dry Power 4 kW, time 35-45 minutes |
| Foam: | Thickness 1.59 cm (0.625 in.) Power 15 kW |
| Cure: | Thermal oven at 288° C. (550° F.), time dependent on panel area |

Specimens prepared as just described were subjected to the tests identified above with multiple specimens being joined with 0.10 inch unidirectional glass using DMS 1911 epoxy film adhesive in those tests requiring a full size (4 ft by 8 ft) panel. Test results are summarized in the table which follows (flammability and smoke density tests were conducted on the core material alone to obtain an accurate indication of their performance in these areas):

TABLE 3

Floor Panel Test Results

| PROPERTY | TEST METHOD | UNITS | GOAL | ACTUAL |
|---|---|---|---|---|
| Weight | D 1622 | Kg/m² | 0.029-0.040 | 0.043 |
| | | lbs/ft² | 0.70-0.95 | 1.03 |
| Thickness | C.-366 | cm | 0.39-0.50 | 0.50 |
| | | in | | |
| Compressive Strength | C-365 | N/m² | 11.7 × 10⁶ minimum | 5.9 × 10⁶ |
| | | lb/in² | 1700 minimum | 855 |
| Warpage | — | cm of warp/m | 0.208 | 0.083 |
| | | in of warp/ft | 0.025 | 0.010 |
| Impact Strength | — | Kg-cm | 34.5-41.4 | 34.5 |
| | | in-lb | 30-36 | 30 |
| Gain in Weight after Humidity Aging | — | % | 6.0 max | 3.9 |
| Core Shear Strength | C 393 | N | 1221 | 3046 |
| | | lbf | 275 | 686 |
| Panel Flexure Strength | C 393 | N | 1021 | 995 |
| | | lbf | 230 | 224 |
| Long Beam Bending | — | cm of deflection | 2.03 | 1.02 |
| | | in of deflection | 0.80 | 0.40 |
| Sandwich Peel Strength | 90° Peel | N/m | 1.12 | 1.30 |
| | | lbf/in | 10 | 11.5 |
| Oxygen Index | D-2863 | — | 40 min | 42 |
| Smoke Density | NBS | | 30-50 | 0 |

EXAMPLE V

Dry particulate precursors can also be employed in manufacturing rigid polyimides by processes employing microwave radiation in accord with the principles of our invention. One such process utilizes a powder precursor in conjunction with microwave heating and constrained foam rise.

Additives are mixed with the powder resin in an Osterizer Blender for 1–2 minutes, and the powder composition is spread on a sheet of Teflon-coated glass. The lay-up techniques used for composites containing liquid resins can be employed to form the panel and to foam and cure the precursor.

Rigid panels have been manufactured by the procedure just described using the following process parameters:

TABLE 4

Process Parameters for the Fabrication of Wall Panel Cores by the Powder Process

| Parameter | 0.991 m² (10.7 ft²) | 0.468 m² (5.04 ft²) |
|---|---|---|
| Loading | 0.070 kg/m² (0.143 lbs/ft²) | 0.070 kg/m² (0.143 lbs/ft²) |
| Thickness | 0.635 cm (0.25 in.) | 0.635 cm (0.25 in.) |
| Lay-up Substrate | M602-0.062 (Taconic Plastics) | M602-0.062 (Taconic Plastics) |
| Coating Thickness | 1.78 cm (0.70 in.) | 1.22 cm (0.48 in.) |
| Foaming Substrate | Pyrex (144 × 123 × 1.60 cm; 57 × 44 × 0.63 in.) | Pyrex 81 × 112 × 1.60 cm; (32 × 44 × 0.63 in.) |
| Reinforcement | 2 sheets 120 style satin weave glass cloth (Owens-Corning) | 2 sheets 120 style satin weave glass cloth (Owens-Corning) |
| Preheat Model | 15 kW (GFE) | 4115 |
| Power | 10 kW | 5 kW |
| Time | 15 minutes | 20 minutes |
| Foaming Power | 10 kW | 5 kW |
| Time | 20 minutes | 20 minutes |
| Curing Model | Despatch | Blue M |
| Temperature | 288° C. (550° F.) | 288° C. (550° F.) |
| Time | 60 minutes | 45 minutes |

EXAMPLE VI

In one instance panels having dimensions of 0.81 × 1.22 m (32 × 48 in.) were produced essentially as described in Example XV from a 1702-1 powder resin modified with 3 percent AS-2 and 1.5 percent Imperial Chemical Company L-170 cross-linking agent and foamed between two coated 120 style satin weave glass fabrics at 10 kW for 20 minutes followed by a thermal postcure at 288° C. (550° F.) for a period of one hour. This one-step microwave process produced a panel with facing skins bonded to the core.

Physical properties of these panels are identified in the following table:

TABLE 5

| PROPERTY | METHOD | UNITS | GOAL | ACTUAL |
|---|---|---|---|---|
| Density | ASTM D 1622 | lb/ft³ | 1.0–5.0 (1) | 8.39 (2) |
| | | Kg/m³ | 16–80 | 134.2 (2) |
| Weight | | lb/ft² | 0.25–0.30 (3) | 0.175 (2) |
| | | Kg/m² | 1.23–1.48 | 0.86 |
| Machinability | — | in | 0.032 Breakout | <0.0312 |
| | | cm | 0.029 Maximum | <0.029 |
| Direct Screw | ASTM D 1761 | lbf | 150 | 196 |
| | | N | 668 | 872 |
| Sandwich Peel Strength | 90° Peel | lbf | 10 | 13.2 |
| | | N | 45 | 59.4 |
| Water Absorption | ASTM D 2842-69 | % | 3 Maximum | 4.0 |
| Oxygen Index | ASTM D 2863 | — | 40 Minimum | 42 |
| Smoke Density DS Uncorrected | NBS | — | 30–50 | 5 |
| TGA | — | °C. | Stable to 204.4 | 400 |
| | | °F. | Stable to 400 | 750 |

(1) Core only
(2) Includes integral skin
(3) Finished panel

EXAMPLE XVII

One other representative type of product that can be advantageously manufactured by employing our invention is thermal acoustical insulation.

These materials are produced from essentially the same particulate polyimide foam precursors and by the same processes used to make flexible resilient foams. Glass fibers, glass microballoons, and other additives are compounded into the powder by milling in a ball mill or by blending in a high speed blender. These compositions are foamed by microwave techniques.

One thermal acoustical insulation was produced as just described by microwave processing of a 1702-1 precursor modified with 3 percent AS-2 surfactant and 20 percent Fiberfrax milled fibers.

A power output of 10 kW was used for foaming, and this was followed by 20 minutes at 15 kW and heating in the circulating air oven at 287.7° C. (550° F.) to cure the insulation.

Actual properties of the resulting insulation are compared with projected goals in the following table:

TABLE 6

Thermal Acoustical Insulation
1702 Resin 3% AS-2

| PROPERTY | ASTM Method | Units | Goal | Actual |
|---|---|---|---|---|
| Density | D-1564 | Kg/m³ | 9.6 | 9.6 |
| | | lbs/ft³ | 0.6 max | 0.6 |
| Breaking Strength | CCC-T-191 | N/m | 175.1 | 893.0 |
| | | lbs/in | 1.0 min | 5.1 |
| Wicking as received | Water immersion | cm | 1.0 max | None |
| | | in | 0.25 max | None |
| | | precipitate | None | None |
| Wicking after oven drying 71.1° C. (160° F.) | Water immersion | cm | 1.0 max | None |
| | | in | 0.25 max | None |
| | | precipitate | None | None |
| Flexibility | | deterioration after bending | None | None |

TABLE 6-continued

| PROPERTY | Thermal Acoustical Insulation 1702 Resin 3% AS-2 | | | |
|---|---|---|---|---|
| | ASTM Method | Units | Goal | Actual |
| | | on one-foot radius | | |
| Corrosion (Aluminum) | | Fitting | None | None |
| Elevated Temperature Resistance | | Weight loss | 15 mg max | 7 mg |
| Oxygen Index | D-2865 | % oxygen | 40 min | 42 |
| Smoke Density DS Uncorrected | NBS | Optical Density | 30–50 max | 2.0 |
| Vertical Bunsen Burner Test, 60 seconds | | Flame Time seconds | 10 max | 0 |
| | | Burn length cm | 15 max | 3.0 |
| | | in | 6 max | 1.2 |
| | | Dripping | | None Detectable |
| Vibration | | 1 Hr 30 Hz 5 cm amplitude | No damage | None |
| Acoustical Properties | | Absorption Coefficient | | |
| | | 1000 Hz | 0.869* | 0.569 |
| | | 2000 Hz | 0.851* | 0.928 |
| | | 3000 Hz | 0.998* | 0.999 |

*Owens Corning PL 105 500W

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by United States Letters Patent is:

1. A method of preparing a reinforced polyimide foam comprising the steps of preparing a liquid resin containing substantially equimolar and essentially unreacted amounts of a 3,3',4,4'-benzophenonetetracarboxylic acid half ester, at least two primary diamines, and a solvent for said ester and said diamines; mixing a multi-partite reinforcement with said resin; evaporating the solvent from the mixture; and converting the ester and diamine constituents of the mixture to a polyimide by subsequently exposing said mixture to microwave radiation for periods of sufficient duration to develop a polyimide chemical structure and a cellular physical structure.

2. A method of preparing a reinforced polyimide foam as defined in claim 1 together with the step of sandwiching the mixture containing the resin and the multi-partite reinforcement between skins of fabric reinforcement prior to evaporating the solvent from the mixture to thereby enhance the physical properties of the resulting artifact.

3. A method of preparing a reinforced polyimide foam as defined in claim 2 wherein said fabric is a woven glass.

4. A method of making a reinforced polyimide foam as defined in claim 2 wherein said glass fabric is coated with a liquid resin as aforesaid prior to sandwiching the mixture of resin and multi-partite reinforcement therebetween to thereby promote the bonding of said fiber to the reinforced polyimide.

5. A method of making a reinforced polyimide foam as defined in claim 1 wherein said multi-partite reinforcement is composed of heat cleaned or unsized strands of glass.

6. A method of preparing a reinforced polyimide foam as defined in claim 1 wherein the mixture of liquid resin and multi-partite reinforcement contains from 5 to 40 weight percent of said reinforcement.

7. A method of preparing a reinforced polyimide foam as defined in claim 1 wherein said multi-partite reinforcement comprises a combination of glass strands and glass microballoons.

8. A method of preparing a reinforced polyimide foam as defined in claim 7 in which the mixture of liquid resin and multi-partite reinforcement contains from 7.5 to 10 weight percent of glass strands and from 12.5 to 15 weight percent of glass microballoons.

9. A method of preparing a reinforced polyimide foam as defined in claim 1 wherein said liquid resin is diluted with said solvent in a ratio of 20 to 30 parts of solvent per 100 parts of resin prior to mixing the multi-partite reinforcement therewith and wherein the resulting mixture is exposed to microwave energy as aforesaid or thermally heated until from 29 to 31 percent by weight of the solvent based on the weight of the mixture has been evolved therefrom.

10. A method of preparing a reinforced polyimide foam as defined in claim 9 wherein the solvent is evaporated from the mixture of liquid resin and multi-partite reinforcement by exposing the mixture to microwave radiation for a period of 2.25 to 12 minutes at a power output in the range of about 1.25 to 2 kW.

11. A method of preparing a reinforced polyimide foam as defined in claim 1 wherein the ester and diamine constituents of the liquid resin and reinforcement mixture are converted to a polyimide foam by exposing the mixture to microwave radiation at a power output of at least 5 kW for a period of 6 to 17 minutes.

* * * * *